(12) United States Patent
Numata

(10) Patent No.: US 10,043,275 B2
(45) Date of Patent: Aug. 7, 2018

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 14/538,156

(22) Filed: Nov. 11, 2014

(65) Prior Publication Data
US 2015/0145988 A1  May 28, 2015

(30) Foreign Application Priority Data

Nov. 28, 2013  (JP) ................................. 2013-246014

(51) Int. Cl.
| | |
|---|---|
| G01B 11/14 | (2006.01) |
| G06T 7/00 | (2017.01) |
| G03B 13/36 | (2006.01) |
| G02B 27/00 | (2006.01) |
| G06T 5/00 | (2006.01) |
| G06T 5/50 | (2006.01) |
| G02B 7/34 | (2006.01) |
| H04N 5/232 | (2006.01) |

(52) U.S. Cl.
CPC .......... *G06T 7/004* (2013.01); *G02B 27/0075* (2013.01); *G03B 13/36* (2013.01); *G06T 5/002* (2013.01); *G06T 5/50* (2013.01); *G02B 7/34* (2013.01); *G06T 2200/21* (2013.01); *H04N 5/23212* (2013.01)

(58) Field of Classification Search
CPC ................................ G01B 11/14; G06T 7/004
USPC ............................................................ 348/36
See application file for complete search history.

(56) References Cited

U.S. PATENT DOCUMENTS

2014/0009585 A1* 1/2014 Campbell .......... H04N 13/0203
348/47

FOREIGN PATENT DOCUMENTS

| JP | 2008-015754 A | | 1/2008 |
|---|---|---|---|
| JP | 2008015754 A | * | 1/2008 |

* cited by examiner

*Primary Examiner* — On S Mung
(74) *Attorney, Agent, or Firm* — Fitzpatrick, Cella, Harper & Scinto

(57) ABSTRACT

An image processing apparatus includes: a distance calculation unit configured to calculate distance information on the basis of a first image and a second image; and a blur addition unit configured to add a blur to original images based on the first image and the second image, using the distance information calculated by the distance calculation unit and to move a focus plane by a predetermined refocus distance. The blur addition unit adds the blur to a first original image when the refocus distance is equal to or less than a threshold and adds the blur to a second original image, which is an image having an effective F-number greater than an effective F-number of the first original image, when the refocus distance is greater than the threshold.

20 Claims, 12 Drawing Sheets

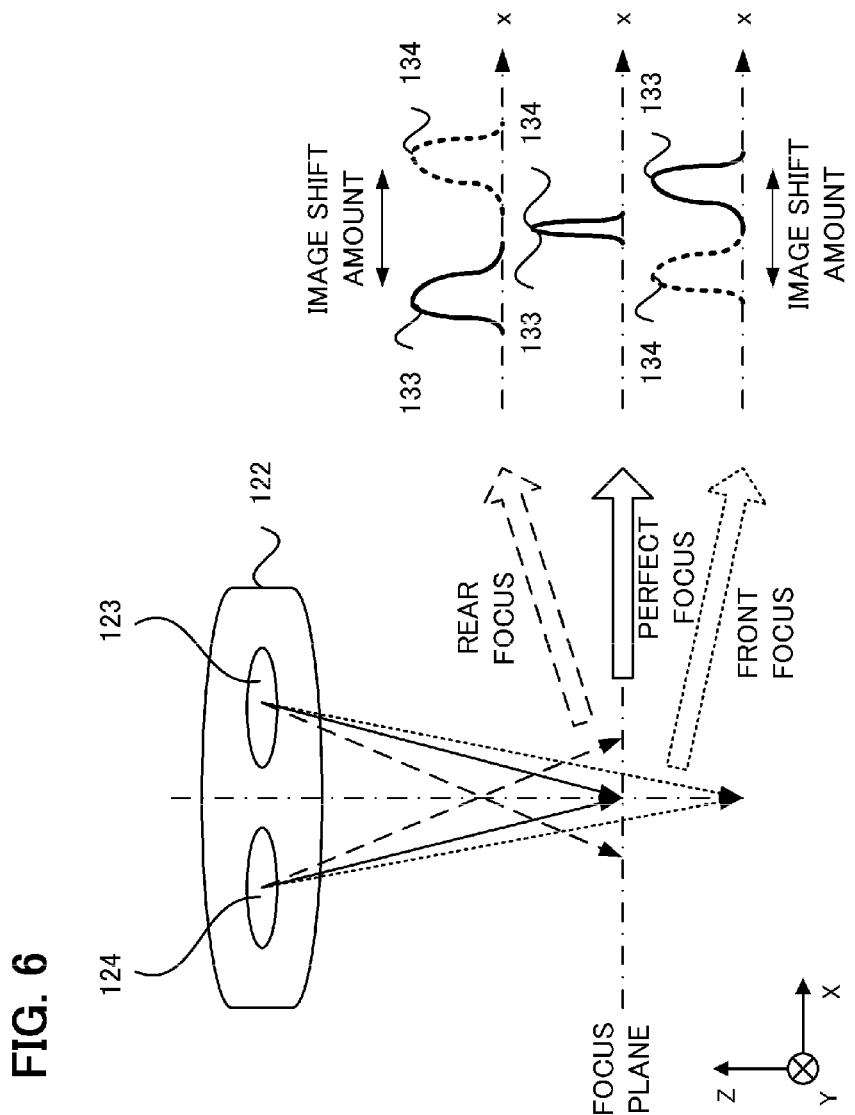

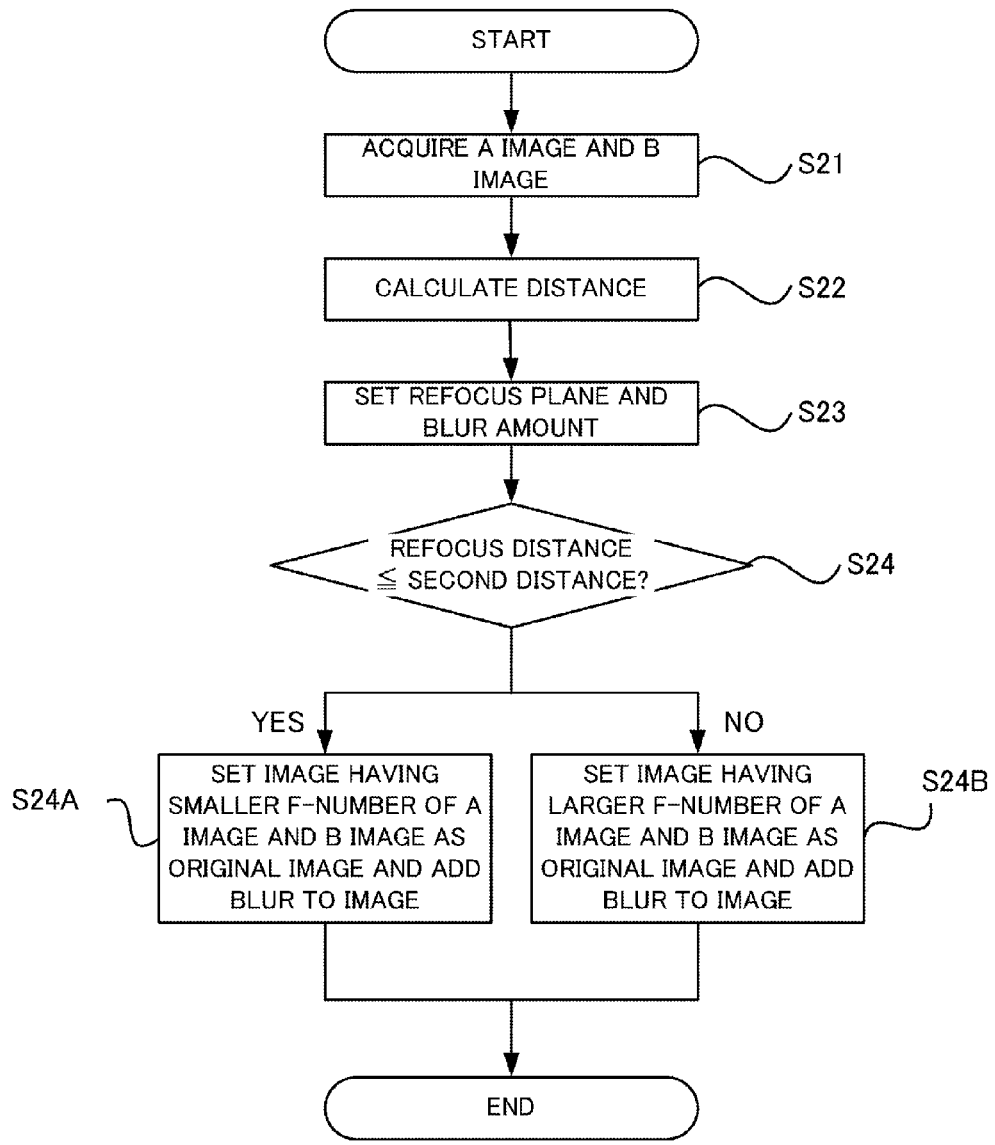

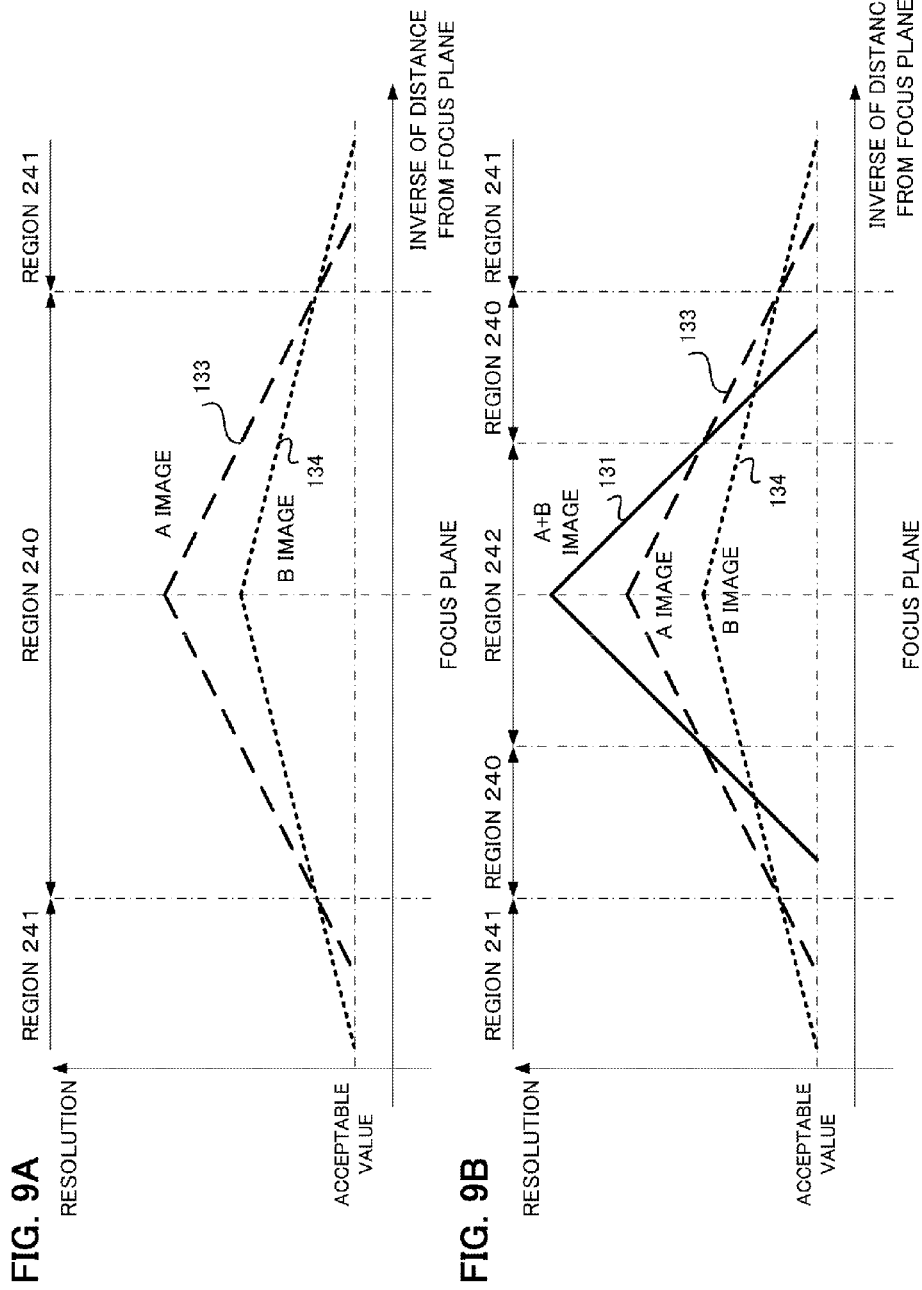

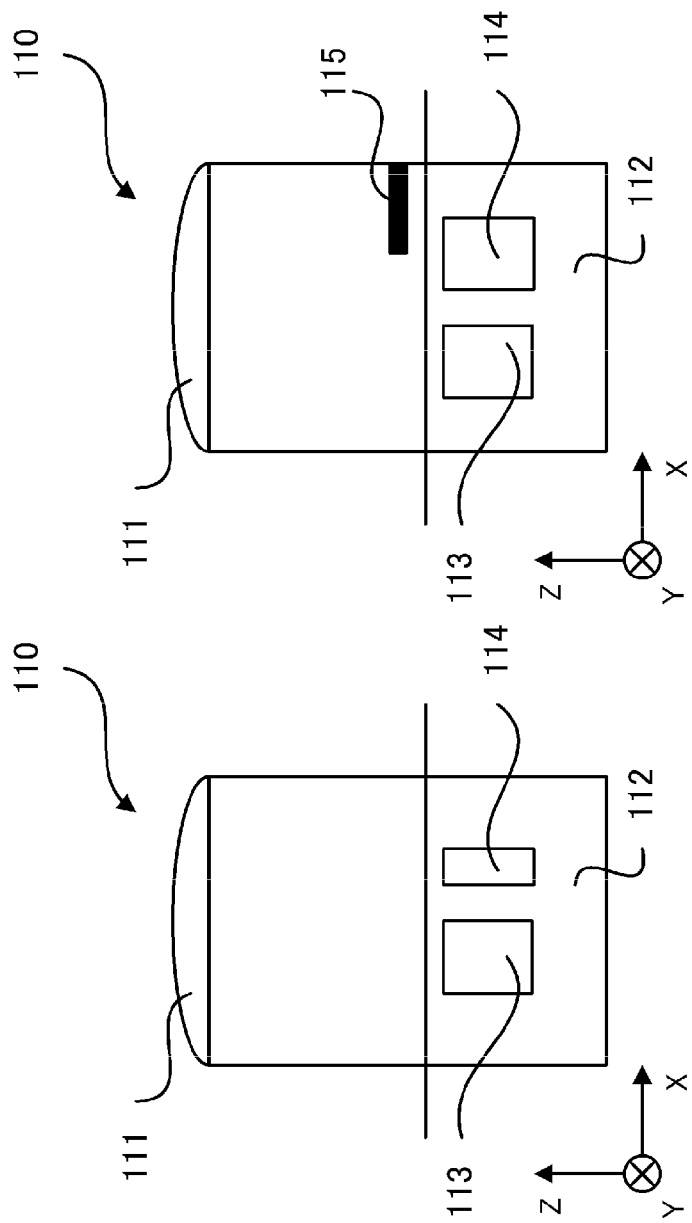

IMAGE PROCESSING APPARATUS, IMAGING APPARATUS, AND IMAGE PROCESSING METHOD

BACKGROUND OF THE INVENTION

1. Field of the Invention

The present invention relates to an image processing apparatus that implements blur addition processing on an image.

2. Description of the Related Art

In a digital still camera and a video camera, there has been proposed a solid-state imaging sensor in which distance measuring pixels (hereinafter, ranging pixels) having a ranging function are arranged in a part or all of pixels of the solid-state imaging sensor to perform detection in a phase difference system. The ranging pixel includes a plurality of photoelectric conversion units and is configured to guide light beams passed through different regions on a pupil of a camera lens to different photoelectric conversion units. Light images (respectively referred to as an A image and a B image and collectively referred to as AB images) generated by the light beams passed through the different pupil regions are acquired according to signals obtained by the photoelectric conversion units included in the ranging pixels. A shift amount, which is a relative position change of the AB images, (hereinafter, image shift amount) is detected. A distance to an object can be calculated by converting the image shift amount into a defocus amount. Consequently, unlike the conventional contrast system, since it is unnecessary to move the lens in order to measure the distance, it is possible to perform high-speed and high-accuracy ranging. The signals detected by the different photoelectric conversion units in the ranging pixels can also be used as pixel values of the ranging pixels for generating a photographed image.

Patent Literature 1 discloses a method of acquiring a distance to an object from an image shift amount, generating a photographed image from a sum of an A image and a B image, and adding a blur corresponding to the distance to the object to the generated photographed image.

Patent Literature 1: Japanese Patent Application Laid-Open No. 2008-15754

SUMMARY OF THE INVENTION

When a blur is added to a photographed image using ranging information, a specific reference plane (hereinafter, refocus plane) is set and image resolution is further reduced for an object further away from the reference plane to generate an image added with a blur. Therefore, the refocus plane can be set only in the vicinity of a focus plane of a photographed image having sufficiently high image resolution. Therefore, the method of Patent Literature 1 has a problem in that a settable refocus range is not sufficient.

The present invention has been devised in view of the above and it is an object of the present invention to provide an image processing technique capable of setting a focus range wider than a focus range in the past in blur addition processing.

According to a first aspect of the present invention, there is provided an image processing apparatus including: a distance calculation unit configured to calculate distance information on the basis of a first image based on a light beam from a first pupil region of an imaging optical system and a second image based on a light beam from a second pupil region of the imaging optical system; and a blur addition unit configured to add a blur to original images based on the first image and the second image, using the distance information calculated by the distance calculation unit and to move a focus plane by a predetermined refocus distance. The blur addition unit adds the blur to a first original image when the refocus distance is equal to or less than a threshold and adds the blur to a second original image, which is an image having an effective F-number greater than an effective F-number of the first original image, when the refocus distance is greater than the threshold.

According to a second aspect of the present invention, there is provided an image processing method in an image processing apparatus including: calculating distance information on the basis of a first image based on a light beam from a first pupil region of an imaging optical system and a second image based on a light beam from a second pupil region of the imaging optical system; and adding a blur to original images based on the first image and the second image, using the calculated distance information and moving a focus plane by a predetermined refocus distance. In adding the blur, the blur is added to a first original image when the refocus distance is equal to or less than a threshold and the blur is added to a second original image, which is an image having an effective F-number greater than an effective F-number of the first original image, when the refocus distance is greater than the threshold.

According to the present invention, it is possible to set a refocus range settable in blur addition processing wider than in the past.

Further features of the present invention will become apparent from the following description of exemplary embodiments with reference to the attached drawings.

BRIEF DESCRIPTION OF THE DRAWINGS

FIG. 6 shows a relation between a distance from a focus plane and a position and a shape of an image;

FIG. 8 shows an operation flow according to a second embodiment;

FIGS. 9A and 9B show a relation between resolution and a distance from a focus plane concerning an A image and a B image;

FIGS. 10A and 10B show modifications of a ranging pixel in the second embodiment;

DESCRIPTION OF THE EMBODIMENTS

Figure 1A:
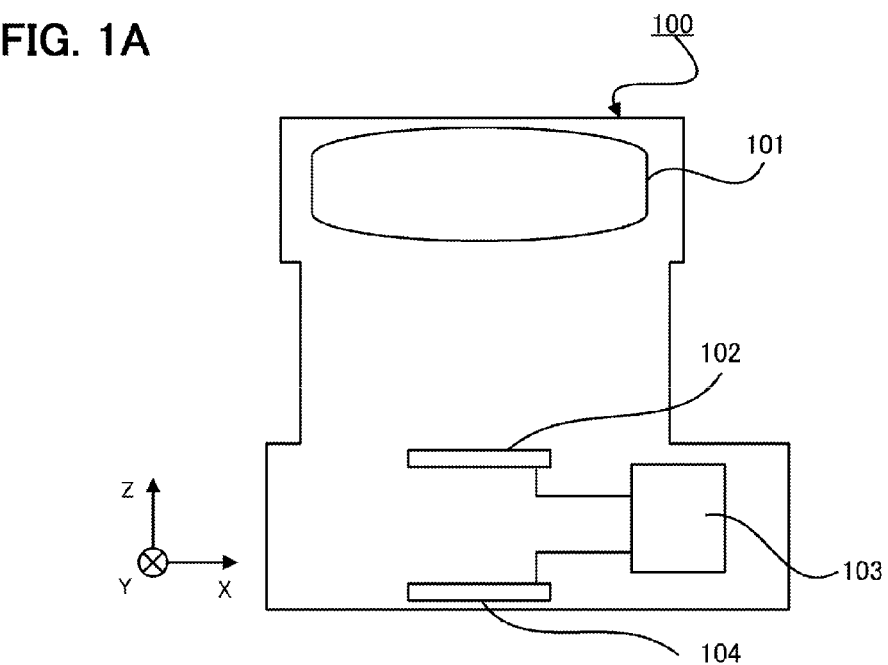
FIGS. 1A and 1B are configuration diagrams of an imaging apparatus and a ranging pixel according to a first embodiment.

Imaging apparatuses in embodiments of the present invention are explained below with reference to the drawings. In the explanation, in all the drawings, components having the same functions are denoted by the same reference numerals and repeated explanation of the components is omitted.

First Embodiment

A first embodiment is an imaging apparatus incorporating an image processing apparatus having a distance calculating function and a blur adding function. The imaging apparatus according to this embodiment has a function of calculating a distance from a photographed image, adding a blur to the image on the basis of the calculated distance, and moving a focus plane by a predetermined refocus distance.

An imaging apparatus 100 in this embodiment is shown in FIG. 1A. In FIG. 1A, the imaging apparatus 100 is configured from an imaging optical system 101, a solid-state imaging sensor 102, a calculation unit 103, and a display unit 104. The imaging optical system 101 images an object image on the solid-state imaging sensor 102. A signal acquired by the solid-state imaging sensor 102 is processed by the calculation unit 103 and displayed on the display unit 104.

<Configuration of a Ranging Pixel>

Figure 1B:
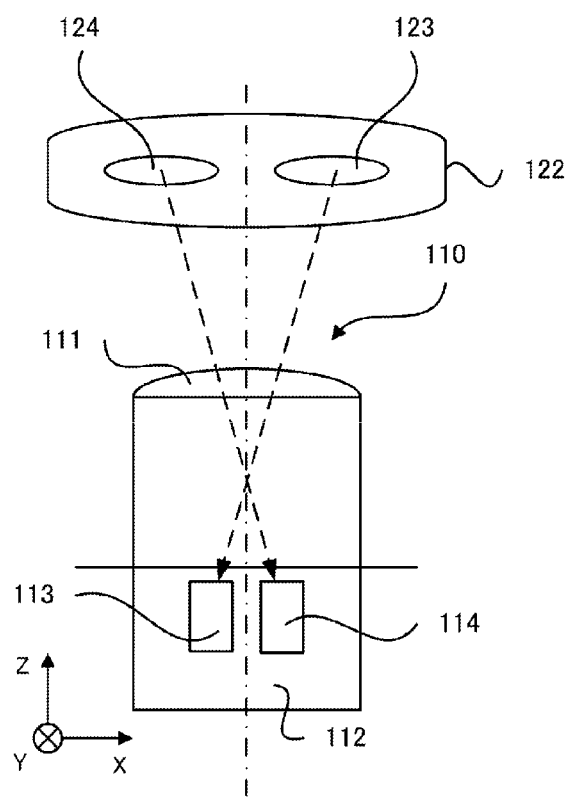

The solid-state imaging sensor 102 includes a plurality of ranging pixels 110 shown in FIG. 1B. The ranging pixel 110 includes a microlens 111 for light beam separation and a substrate 112. The microlens 111 is formed of, for example, $SiO_2$, which is a material transparent in a wavelength band to be detected. The substrate 112 is formed of a material such as Si having absorption in the wavelength band to be detected. In the substrate 112, two photoelectric conversion units 113 and 114 formed by ion implantation or the like are formed. Charges generated in the photoelectric conversion units are transferred to the calculation unit 103 (the image processing apparatus) by a not-shown wire.

The microlens 111 is arranged to extend across the photoelectric conversion units 113 and 114 and guides light beams having different incidence directions transmitted through different pupil regions respectively to different photoelectric conversion units. The microlens 111 guides a light beam made incident from a pupil region 123 eccentric in a +x direction in an exit pupil 122 of the imaging optical system 101 to the photoelectric conversion unit 113. The microlens 111 guides a light beam made incident from a pupil region 124 eccentric in a −x direction to the photoelectric conversion unit 114. A direction (an x direction) connecting the center of gravity of a transmittance distribution of the pupil region 123 and the center of gravity of a transmittance distribution of the pupil region 124 is referred to as pupil division direction. Note that the optical axis of the imaging optical system 101 is a z direction.

In the plurality of ranging pixels 110, an A image (a first image) can be acquired according to a pixel signal from the photoelectric conversion unit 113 and a B image (a second image) can be acquired according to a pixel signal from the photoelectric conversion unit 114. That is, the imaging apparatus 100 includes a first imaging unit that receives a light beam from a first pupil region 123 and a second imaging unit that receives a light beam from a second pupil region 124 different from the first pupil region 123. The A image and the B image can be considered two images at different visual points having a parallax equivalent to a distance between the centers of gravity of the first and second pupil regions.

<Blur Addition Processing Flow>

Figure 2:
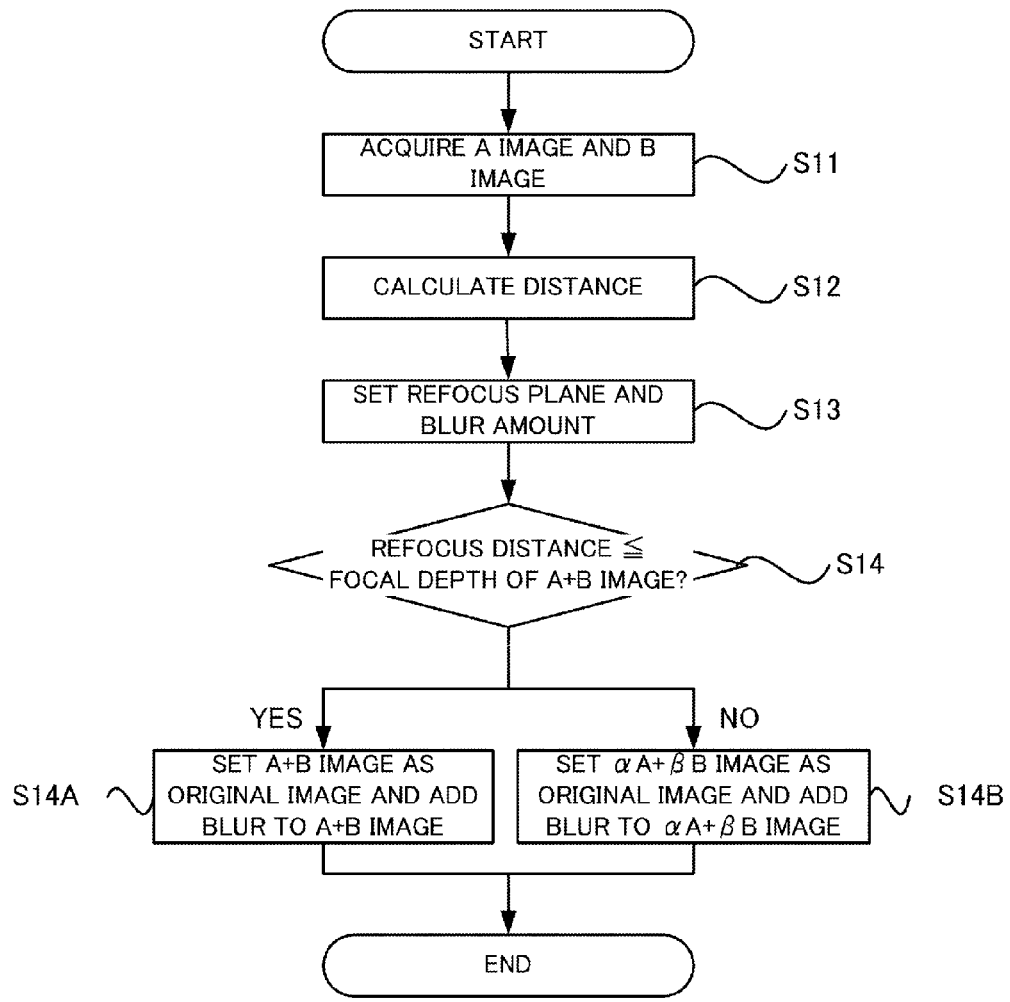
FIG. 2 shows an operation flow according to the first embodiment.

FIG. 2 shows an operation flow in performing blur addition involving movement of a refocus plane in the imaging apparatus 100.

First, in step S11, according to the method explained above, the imaging apparatus 100 acquires, with the first imaging unit and the second imaging unit, an A image (a first image) and a B image (a second image) in the plurality of ranging pixels 110.

Subsequently, according to distance calculation processing in step S12, the imaging apparatus 100 calculates a distance distribution of an object from the acquired A image (first image) and the acquired B image (second image) using publicly-known means. For example, the imaging apparatus 100 slices a part of a pair of A and B images, calculates an image shift amount according to a correlation operation in a sliced window, and calculates a base line length from an interval between the center of gravity of a transmittance distribution of the pupil region 123 and the center of gravity of a transmittance distribution of the pupil region 124. The imaging apparatus 100 can calculate a defocus amount from the calculated image shift amount and the calculated base line length. If the imaging apparatus 100 performs the correlation operation while shifting the window, the imaging apparatus 100 can acquire the distance distribution of the object.

Subsequently, in step S13, the imaging apparatus 100 sets a refocus plane and a blur amount to be added. In this case, the imaging apparatus 100 may display the image acquired in S11 and the distance distribution calculated in S12 on the display unit 104. A photographer (a user) may manually set the refocus plane and the blur amount. The imaging apparatus 100 may automatically set the refocus plane and the blur amount from the image acquired in S11 and the distance distribution calculated in S12. For example, the imaging apparatus 100 can determine a main object in the image acquired in S11 using a publicly-known face recognition technique and set a refocus plane adjusted to the main object.

In blur addition processing in the last step S14, the imaging apparatus 100 performs case classification according to a distance between the set refocus plane and focus planes of the photographed AB images (hereinafter, refocus distance).

When the refocus distance is equal to or smaller than a depth of field of an image consisting of a sum of the A image and the B image (hereinafter A+B image), as in Patent Literature 1, the imaging apparatus 100 generates an original image from the A+B image and adds a blur corresponding to the distance to the object to the generated original image (step S14A). The A+B image is equivalent to the first original image in the present invention. As a specific method of blur addition, a set F-number of a blur image desired to be added and a point image distribution function generated according to the distance from the refocus plane to the object only have to be convoluted to generate a blur added image.

On the other hand, when the refocus distance is greater than the field of depth of the A+B image, the imaging apparatus 100 uses, as the original image, an image consisting of a sum of an image obtained by multiplying the A image with α and an image obtained by multiplying the B image with β (hereinafter, αA+βB image) (step S14B). In step S14B, the imaging apparatus 100 sets a ratio of α and β p to a value other than 1. In the following explanation, when the αA+βB image is referred to, it is assumed that the ratio of α and β is a value other than 1.

That is, when the refocus distance is equal to or smaller than the depth of field of the A+B image, the imaging apparatus 100 uses, as the original image (the first original image), an A+B image obtained by adding up the A image and the B image at a same ratio. On the other hand, in step S14B, when the refocus distance is greater than the depth of field of the A+B image, the imaging apparatus 100 uses, as the original image (the second original image), an αA+βB image obtained by adding up the A image and the B image at a ratio other than 1-to-1.

By using such an operation flow, it is possible to set a settable focus range wider than when the conventional method is used. A reason for this is explained below.

Figure 3A:
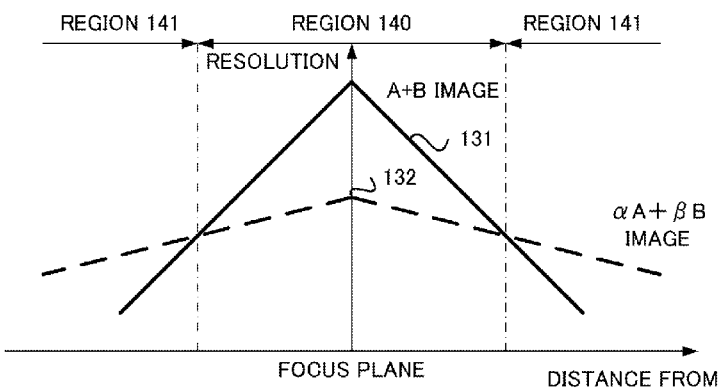
FIGS. 3A to 3C show a relation between resolution and a distance from a focus plane at each F-number.

FIG. 3A is a diagram showing resolution 131 of the A+B image and resolution 132 of the αA+βB image. In general, the resolution of an imaging optical system is the highest in the vicinity of a focus plane and decreases further away from the focus plane generally in proportion to an inverse of the distance from the focus plane when an object is sufficiently distant. Although slightly shifting because of the influence of aberration and diffraction, the resolution on the focus plane is roughly in inverse proportion to an effective F-number, which is set taking into account pupil transmittance of the imaging optical system. Further, although slightly shifting because of the influence of aberration and diffraction, a proportionality coefficient of the resolution with respect to the inverse of the distance from the focus plane is roughly in inverse proportion to a square of the effective F-number of the imaging optical system.

In the ranging pixel 110, the A+B image is generated according to a sum of a light beam from the pupil region 123 and a light beam from the pupil region 124 in the exit pupil of the imaging optical system 101. On the other hand, the αA+βB image is generated according to a sum of a part of the light beam from the pupil region 123 and a part of the light beam from the pupil region 124. Therefore, the effective F-number of the αA+βB image is larger than the effective F-number of the A+B image.

Therefore, the A+B image has resolution higher than the resolution of the αA+βB image in the vicinity of the focus plane (a region 140). A difference between the resolution of the A+B image and the resolution of the αA+βB image decreases when the images are further away from the focus plane. When the images are away from the focus plane by a fixed value or more, the resolution of the αA+βB image is higher than the resolution of the A+B image (a region 141).

Figure 3B:
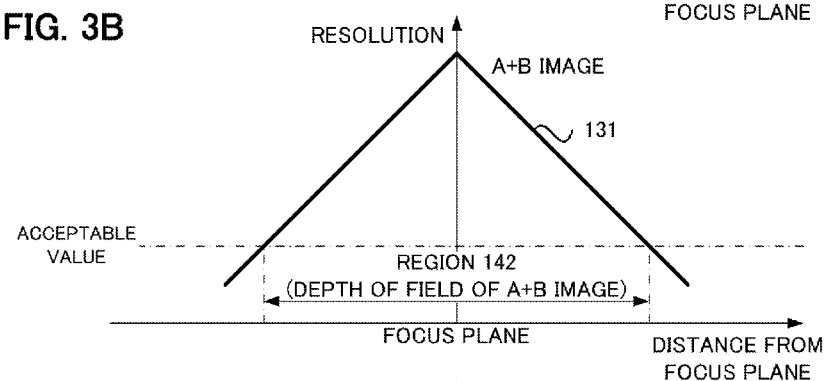

In the conventional method disclosed in Patent Literature 1, the A+B image is used as the original image irrespective of a refocus plane. Therefore, a settable refocus plane is limited to a region 142 shown in FIG. 3B. An upper limit and a lower limit of the region 142 are determined from the depth of field of the A+B image. The depth of field of the A+B image is calculated from an intersection of an acceptable value of resolution determined by the size of an acceptable circle of confusion and the resolution of the A+B image in FIG. 3B. The size of the acceptable circle of confusion is determined on the basis of the size of one pixel of an image, printing magnification in printing of the image, and resolution (1 minute) of eyes. The resolution of the A+B image can be calculated by a simulation using design values of the imaging optical system.

Figure 3C:
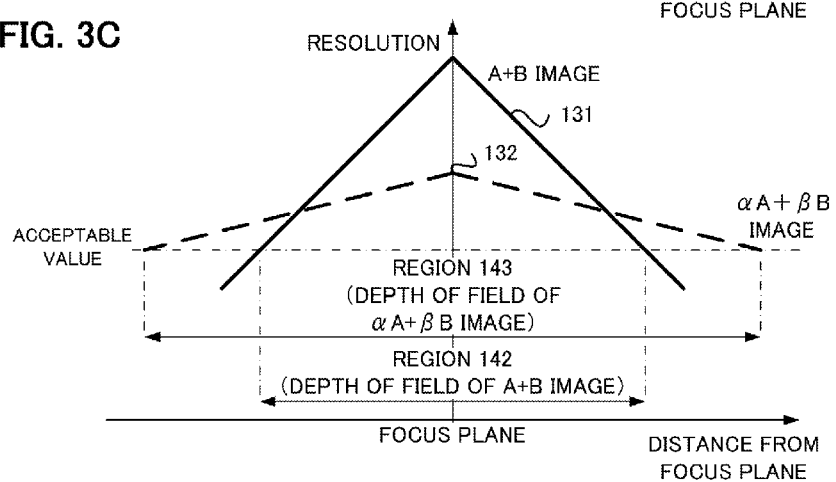

On the other hand, in this embodiment, when the refocus distance is greater than the depth of field of the A+B image, the αA+βB image is used as the original image. As explained above, when the images are away from the focus plane by the fixed value or more, the αA+βB image has resolution higher than the resolution of the A+B image. Therefore, a region 143 calculated from the depth of field of the αA+βB image is wider than the region 142 calculated from the depth of field of the A+B image (FIG. 3C). That is, a refocus distance settable when the method in this embodiment is used is greater than a refocus distance settable when the conventional method is used. A degree of freedom of refocus is improved.

<Specific Example of the Coefficients α and β>

Figure 4A:
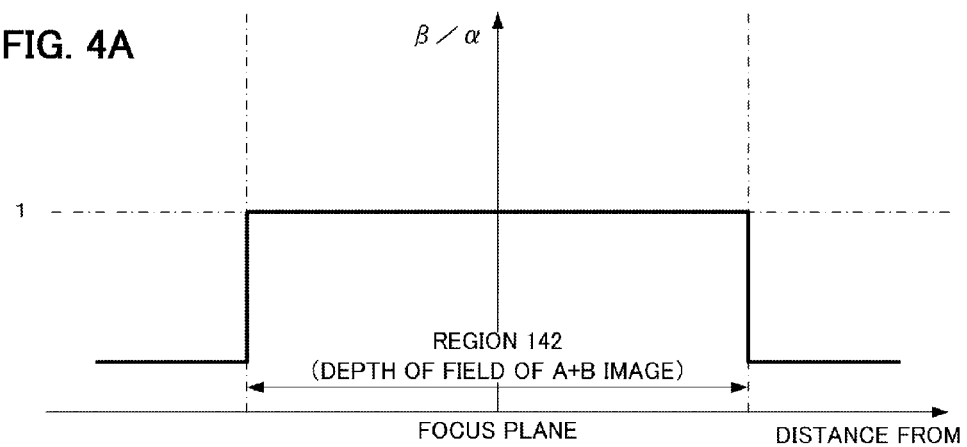
FIGS. 4A to 4C show a relation of a ratio of $\alpha$ and $\beta$ corresponding to a refocus distance.
Figure 4B:
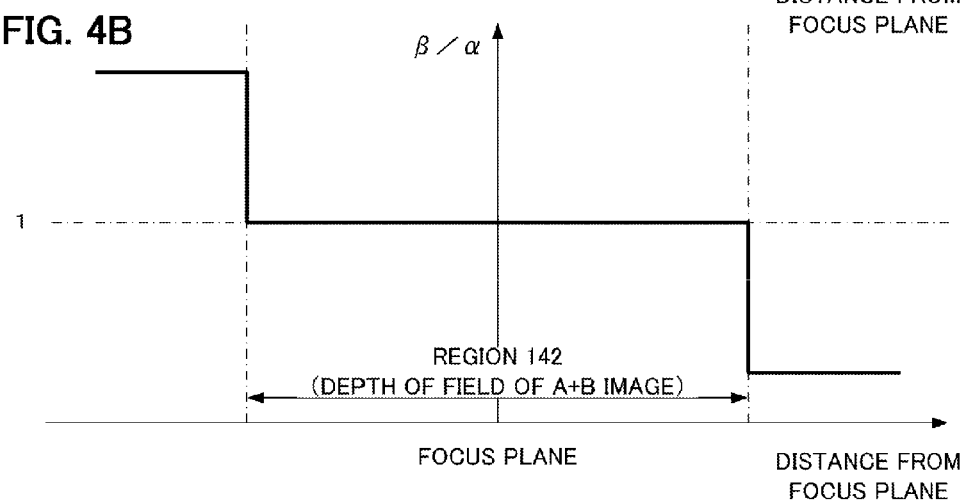

Note that, when the refocus distance is greater than the depth of field of the A+B image, if the ratio of α and β is other than 1, a settable range of refocus can be expanded. For example, as shown in FIG. 4A, the ratio of α and β may be equal when the refocus plane is closer than the focus plane and when the refocus plane is more distant than the focus plane. As shown in FIG. 4B, a magnitude relation of α and β may be changed when the refocus plane is close and when the refocus plane is distant. In particular, it is preferable to set the ratio of α and β to 0 or infinite, that is, use the A image (the first image) or the B image (the second image) itself as the original image because the freedom of refocus is further improved. This is because, since the A image (or the B image) receives only a light beam from the pupil region 123 (or the pupil region 124), the F-number of the original image is larger than when the ratio of α and β is not 0 or infinite.

<When the Refocus Distance is Equal to or Smaller than a Threshold>

In the operation flow shown in FIG. 2, the A+B image is used as the original image (the first original image) when the refocus distance is equal to or smaller than the depth of field of the A+B image. That is, when the refocus distance is equal to or smaller than the depth of field of the A+B image, an image obtained by adding up the A image and the B image with a same ratio is used as the original image. However, images obtained by adding up the A image and the B image at other ratios may be used as the original image. However, it is preferable to add up the A image and the B image with a same ratio because an operation amount is smaller than when the A image and the B image are added up at other ratios.

<Switching Threshold>

Figures 5A, 5B:
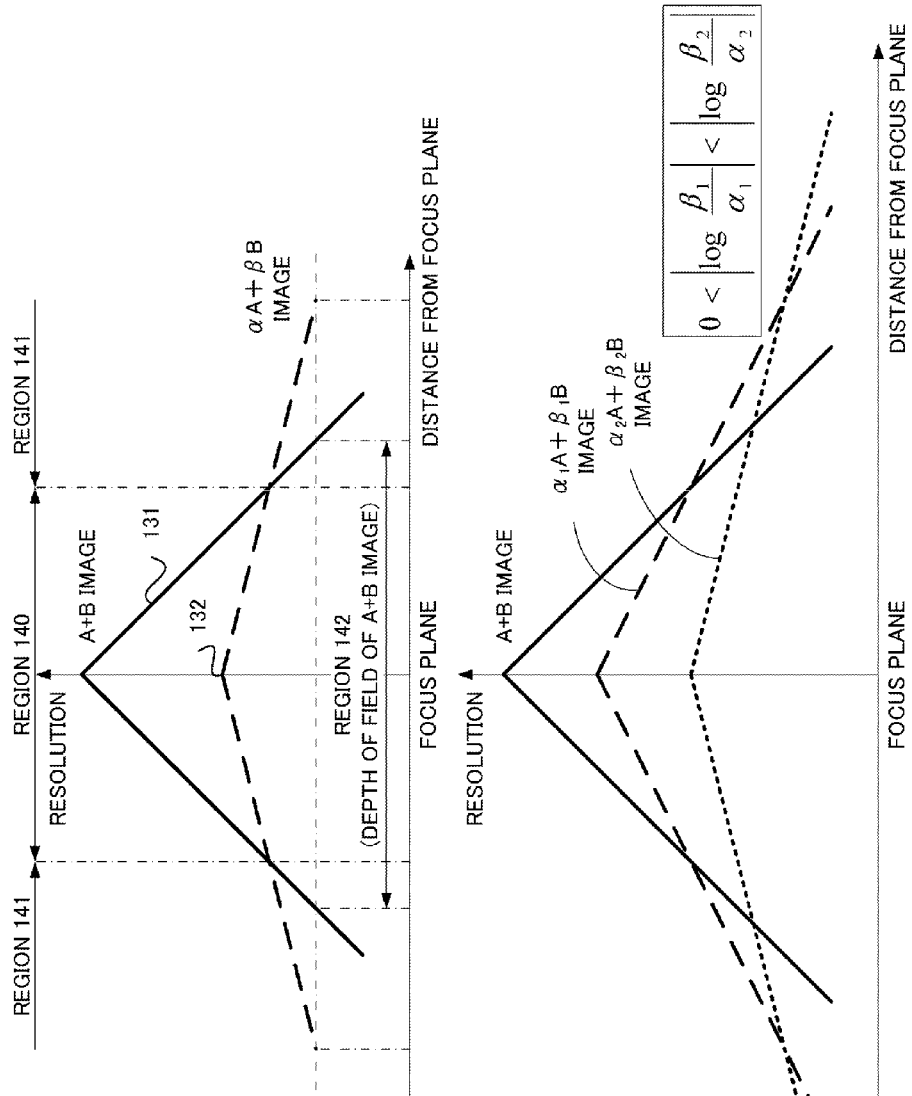
FIGS. 5A and 5B show a relation between resolution and a distance from a focus plane at each ratio of $\alpha$ and $\beta$.

In the operation flow shown in FIG. 2, the field of depth of the A+B image is set as a threshold and the original image to be used is switched according to a magnitude relation between the refocus distance and the threshold. However, if the αA+βB image (the second original image) can be used when the refocus distance is greater than the depth of field of the A+B image, the threshold may be a value other than the depth of field of the A+B image. Specifically, the threshold can be set to a value smaller than the depth of field of the A+B image. The threshold (a first distance) is preferably set to a distance (a boundary between the regions 140 and 141) at which the resolution of the first original image and the resolution of the second original image are equal. That is, it is preferable to set, as the threshold, a distance (the first distance) at which the resolution of the A+B image, which is the original image used when the refocus distance is equal to or smaller than the threshold, and the resolution of the αA+βB image, which is the original image used when the refocus distance is greater than the threshold, are equal. Consequently, it is possible to generate an image having high resolution in the vicinity of the refocus plane (FIG. 5A). The first distance only has to be determined on the basis of design values (zoom, focus, and aberration) of the imaging optical system 101 and a pupil division characteristic of the solid-state imaging sensor 102.

<Multi-Stage Switching>

Figure 4C:
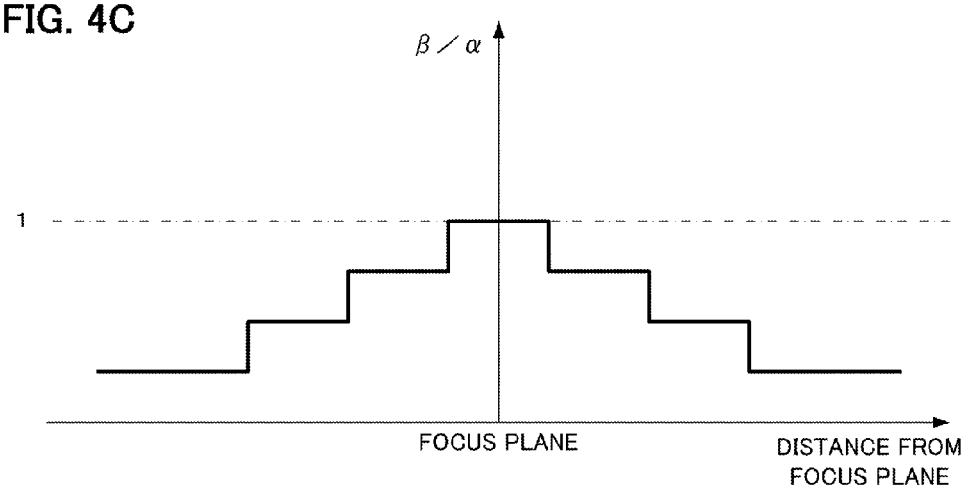

Further, the original image to be used may be switched in three or more stages according to a set refocus distance. In this case, as shown in FIG. 4C, it is preferable to set an absolute value of a logarithm of β/α to be more distant from 0 as the set refocus distance is greater because it is possible to generate an image having high resolution in the vicinity of the refocus plane. This is because, as the absolute value of the logarithm of β/α is set to be more distant from 0, the αA+βB image has higher resolution when the refocus distance is large (FIG. 5B).

It is preferable to increase the number of original images to be used and continuously change the ratio of α and β because it is possible to obtain an image having high resolution irrespective of the refocus distance. On the other hand, it is preferable that the number of original images to be used is smaller because an operation amount is small.

<Image Shift>

The image used as the original image in step S14B is preferably an image obtained by shifting the αA+βB image using the distance information calculated in step S12. This is because, since center-of-gravity positions of an A image 133 and a B image 134 shift according to the distance from the focus plane as shown in FIG. 6, a more natural refocus image is obtained when the center-of-gravity positions of the images are shifted according to the distance. Specifically, the A image and the B image obtained in step S12 are shifted to the opposite side of an image shift direction by a half of an image shift amount between the AB images. Images after the shift are respectively multiplied by α and β and added up to generate the αA+βB image. Consequently, the center-of-gravity positions of the images are fixed irrespective of the distance from the focus plane.

<Image Correction>

Further, the image used as the original image in step S14B is preferably an image obtained by applying image correction processing to the αA+βB image on the basis of a transmittance distribution of the pupil region 123 or 124 corresponding to the image. This is because, since the A image 133 and the B image 134 are images having an asymmetrical blur reflecting transmittance distributions of the pupil regions 123 and 124 as shown in FIG. 6, a more natural focus image is obtained when the shape of a blur is corrected to a symmetrical shape. For example, the image correction processing is processing for convolution-integrating the A image and the B image with an inverse function of a point image distribution function of the imaging optical system 101, which reflects the transmittances of the pupil regions 123 and 124 corresponding to the images. The A image and the B image after image correction only have to be respectively multiplied with α and β and then added up to generate the αA+βB image, which is the original image of the blur addition processing.

<Specific Pixel Arrangement>

In the imaging apparatus in this embodiment, the ranging pixels 110 may be arranged in a part of the pixels of the solid-state imaging sensor 102 and pixels for image acquisition may be arranged in the other pixels. Ranging can be performed by the part of the pixels 110 and an image of the object can be acquired by the remaining pixels. However, it is preferable to provide the ranging pixels 110 over the entire surface of the solid-state imaging sensor 102 because the resolution of the original image in step S14 is improved.

Figure 7A:
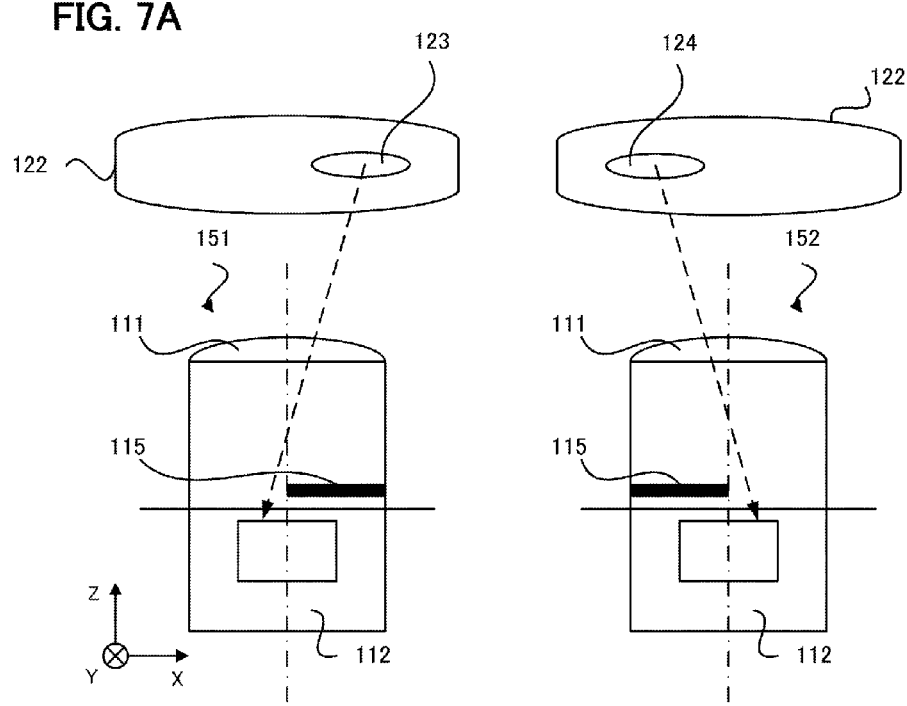
FIGS. 7A to 7C show modifications of the ranging pixel in the first embodiment.

The solid-state imaging sensor 102 may include a plurality of pixels 151 and 152 shown in FIG. 7A. The pixel 151 and the pixel 152 are arranged adjacent to each other. The pixel 151 receives light from the pupil region 123 eccentric in the +x direction. The pixel 152 receives light from the pupil region 124 eccentric in the −x direction. Specifically, a light blocking film 115 is arranged to be eccentric from the optical axis of the microlens 111. A part of an incident light beam is absorbed by the light blocking film 115 to perform pupil division. The A image can be acquired from a pixel signal of the pixel 151. The B image can be acquired from a pixel signal of the pixel 152.

Figure 7B:
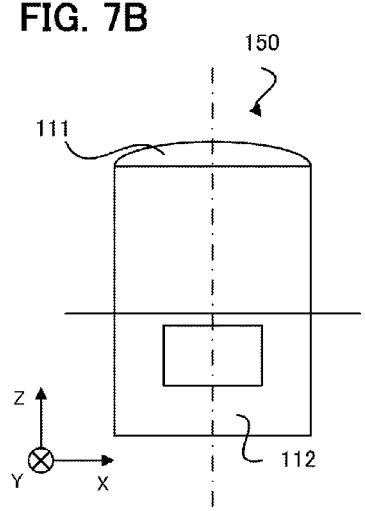

Further, the solid-state imaging sensor 102 may include a plurality of pixels 150 shown in FIG. 7B and the pixels 151 or 152 shown in FIG. 7A. The pixel 150 receives light from the entire area of the pupil. The B image (the A image) can be acquired by calculating a difference between image signals of the pixel 150 and the pixel 151 (152). For example, in the case of a solid-state imaging sensor including the pixel 150 and the pixel 151, the A image can be acquired from a pixel signal of the pixel 151 and the B image can be acquired from a difference between signals of the pixel 150 and the pixel 151.

Figure 7C:
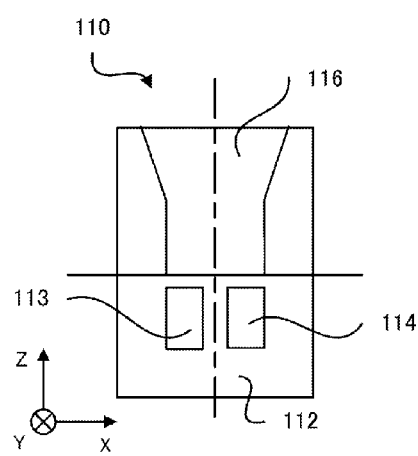

In the ranging pixel 110 shown in FIG. 2, the microlens 111 is used as an incident direction separation unit. However, a waveguide 116 may be used as shown in FIG. 7C. By combining the waveguide 116 with a waveguide mode corresponding to an incident direction, it is possible to guide lights from different pupil regions to different photoelectric conversion units.

Second Embodiment

An operation flow in performing blur addition involving movement of a refocus plane in an imaging apparatus according to a second embodiment of the present invention is shown in FIG. 8. The operation flow in this embodiment is different from the operation flow (FIG. 2) in the first embodiment only in step S24 for performing the blur addition involving the movement of the refocus plane. In the operation flow in this embodiment, in step S24, the imaging apparatus switches an original image to be used between the A image and the B image according to the refocus distance.

When the refocus distance is equal to or smaller than the threshold, the imaging apparatus sets an image having a smaller effective F-number of the A image and the B image as the original image and adds a blur to the image (step S24A). When the refocus distance is greater than the threshold, the imaging apparatus sets an image having a larger effective F-number of the A image and the B image as the original image and adds a blur to the image (step S24B).

By switching the original image to be used between the AB images according to the effective F-number in this way, it is possible to set the refocus range wider. FIG. 9A shows the resolution of the A image and the resolution of the B image obtained when the B image has the effective F-number larger than the F-number of the B image. As explained above, resolution is determined by the effective F-number. As the F-number is smaller, the resolution in the vicinity of the focus plane is high but deterioration in the resolution is large when an image is away from the focus plane. Therefore, the resolution of the A image is high in a region 240 in the vicinity of the focus plane and the resolution of the B image is high in a region 241 away from the pupil surface. Therefore, if the original image is switched between the A image having the small F-number and the B image having the large F-number according to a magnitude relation between the refocus distance and the threshold, it is possible to further improve the degree of freedom of the settable refocus plane.

It is preferable to set the threshold to a distance (a boundary between the region 240 and the region 241) at which the resolution of the A image (the first image) and the resolution of the B image (the second image) are equal.

Consequently, it is possible to generate an image having high resolution in the vicinity of the refocus plane. When the refocus distance is equal to or smaller than the depth of field of the A+B image, as in the operation flow shown in FIG. 2, the A+B image may be used (FIG. 9B). In this case, three kinds of original images are used, i.e., the A+B image is used in the region 242, the A image is used in the region 240, and the B image is used in the region 241 according to the refocus distance.

<Control Method for the Effective F-Numbers>

A method of controlling the effective F-numbers of the A image and the B image is shown in FIGS. 10A and 10B. In FIGS. 10A and 10B, in the ranging pixel 110 in the solid-state imaging sensor 102, an aperture ratio of a photoelectric conversion unit 213 that acquires the A image is set larger than an aperture ratio of a photoelectric conversion unit 214 that acquires the B image. The photoelectric conversion unit 213 detects light from a pupil region wider than a pupil region from which the photoelectric conversion unit 214 detects light. Therefore, the effective F-number of the B image can be set larger than the effective F-number of the A image. To control the aperture ratios, the size in an in-plane direction of the photoelectric conversion unit may be changed as shown in FIG. 10A or the light blocking film 115 may be provided above the photoelectric conversion unit as shown in FIG. 10B to limit a light beam made incident on the photoelectric conversion unit.

The effective F-number of the A image or the B image may be dynamically controlled according to a set refocus distance. In this case, after setting the refocus distance in step S22, the imaging apparatus only has to return to step S21 and change the effective F-number according to the set refocus distance.

Figure 11A:
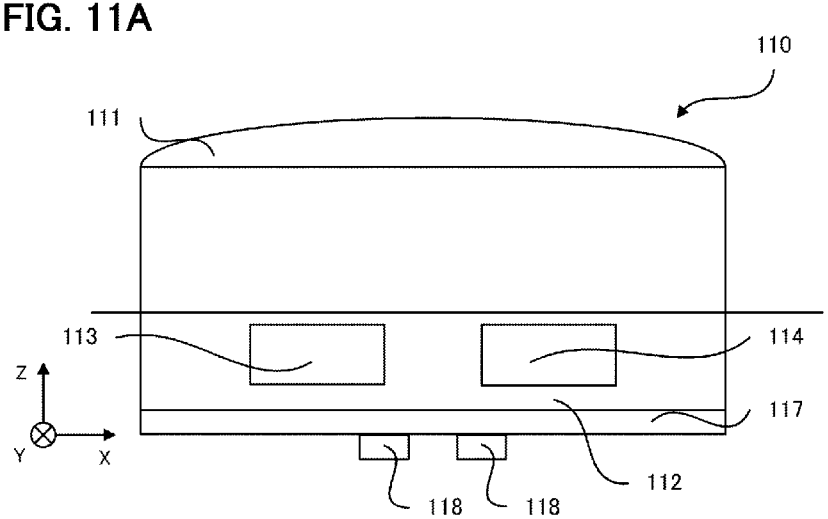
FIGS. 11A and 11B show modifications of the ranging pixel in the second embodiment.

For example, as shown in FIG. 11A, control electrodes 118 (aperture ratio control units) may be provided beside the photoelectric conversion unit via an insulator film 117. Bias may be applied to the photoelectric conversion unit to control a potential distribution inside a semiconductor and dynamically change the aperture ratio. By setting the aperture ratio smaller as the refocus amount is larger, it is possible to further improve the degree of freedom of the refocus plane.

Figure 11B:
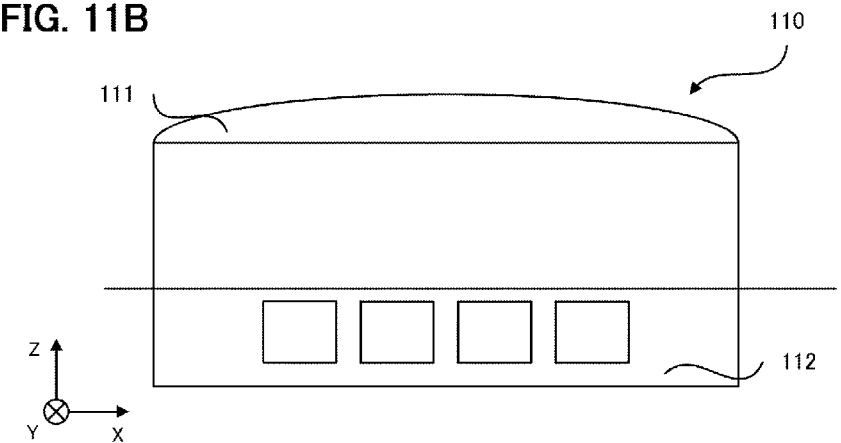

As shown in FIG. 11B, three or more photoelectric conversion units may be set. A pixel signal may be generated using signals of the plurality of photoelectric conversion units. If the number of photoelectric conversion units that generate the original image is changed, the effective F-number can be controlled. If the number of photoelectric conversion units that generate the original image is set smaller as the refocus distance is greater, it is possible to further improve the degree of freedom of the refocus plane.

Third Embodiment

An imaging apparatus in a third embodiment changes an original image to be used according to a pixel position of the ranging pixel 110 in the solid-state imaging sensor 102. That is, when the refocus distance is equal to or smaller than the threshold, the imaging apparatus uses, in each pixel position, an image consisting of a pixel value having a smaller effective F-number as the original image. When the refocus distance is greater than the threshold, the imaging apparatus uses an image consisting of a pixel value having a larger effective F-number as the original image.

In general, according to the distance between the pupil region 123 of the imaging optical system and the solid-state imaging sensor, vignetting of the imaging optical system 101, and the like, transmittance of the pupil regions 123 and 124 that transmit lights to be received by the photoelectric conversion units 113 and 114 changes.

Figure 12A:
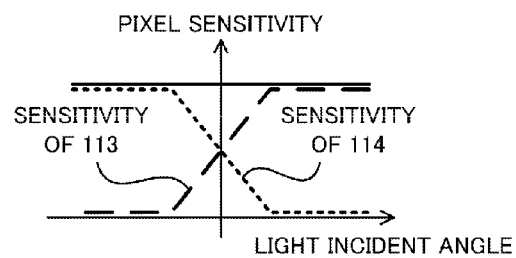
FIGS. 12A to 12C show a change in a received light beam according to sensitivity and a position of the ranging pixel.
Figure 12B:
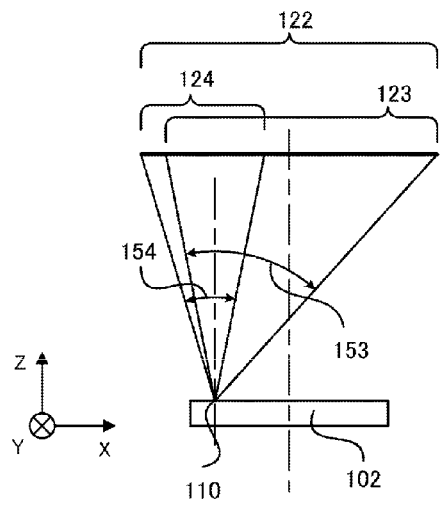
Figure 12C:
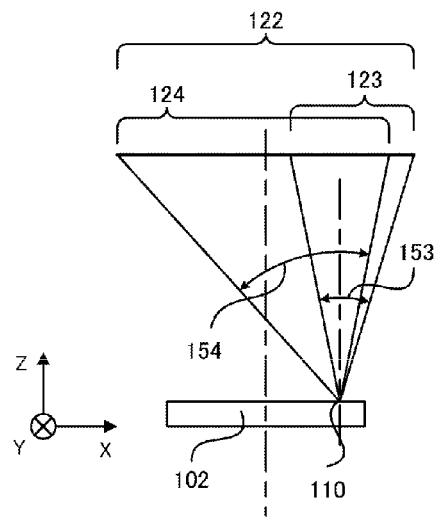

For example, as shown in FIG. 1B, when the photoelectric conversion units 113 and 114 having the same shape are arranged in positions symmetrical to each other with respect to the optical axis of the microlens 111 set as the center axis, a sensitivity characteristic of the ranging pixel has a symmetrical shape with respect a light incident angle of 0 degree set as an axis (FIG. 12A). When the exit pupil 122 of the imaging optical system is present at a finite distance from the solid-state imaging sensor 102, in a peripheral region in the −x direction of the solid-state imaging sensor, a spread angle of a light beam 153 from the pupil region 123 is larger than a spread angle of a light beam 154 from the pupil region 124 (FIG. 12B). On the other hand, in a peripheral region in the +x direction of the solid-state imaging sensor, a spread angle of the light beam 154 from the pupil region 124 is larger than a spread angle of the light beam 143 from the pupil region 123 (FIG. 12C).

Therefore, in a region (a first region) further on a −x direction side than the center of the solid-state imaging sensor 102, the image (the A image) based on the light beam from the pupil region 123 has the effective F-number smaller than the effective F-number of the image (the B image) based on the light beam from the pupil region 124. Conversely, in a region (a second region) further on a +x direction side than the center of the solid-state imaging sensor 102, the image (the B image) based on the light beam from the pupil region 124 has the effective F-number smaller than the effective F-number of the image (the A image) based on the light beam from the pupil region 123. In this way, the images having the large effective F-number are reversed in the two symmetrical regions (the first and second regions) centering on a straight line parallel to a y direction passing the center of the solid-state imaging sensor.

<Region Switching>

As explained above, the resolution of an image is determined by an F-number. Therefore, when the F-number changes according to a position of a ranging pixel in the solid-state imaging sensor, it is preferable to switch, according to a position on an image plane of an object, an image used as the original image. It is more preferable to implement switching with respect to the original image to be used according to the refocus distance.

For example, when the ranging pixel 110 shown in FIG. 1B is used and the exit pupil 122 of the imaging optical system is present in a finite distance from the solid-state imaging sensor 102, it is desirable to perform processing as explained below.

When the refocus distance is equal to or smaller than the threshold, an image formed by the A image in a region on the −x direction side of the solid-state imaging sensor 102 and formed by the B image in a region on the +x direction is set as the original image (the first original image) and blur addition processing is performed. Consequently, it is possible to generate an image having high resolution on the set refocus plane irrespective of an image on the image plane of the object.

On the other hand, when the refocus distance is greater than the threshold, an image formed by the B image in the region (the first region) on the −x direction side of the solid-state imaging sensor 102 and formed by the A image in the region on the +x direction is set as the original image (the second original image) and the blur addition processing is performed. Consequently, it is possible to generate an image having a large refocus distance irrespective of a position on the image plane of the object.

Other Embodiments

The embodiments are explained above to illustratively explain the present invention and are not intended to limit the present invention. The respective constituent elements of the embodiments can be combined and implemented as much as possible.

The blur addition technique of the present invention explained above can be suitably applied to, for example, imaging apparatuses such as a digital camera and a digital camcorder and an image processing apparatus and a computer that apply image processing to image data obtained by the imaging apparatuses. The technique of the present invention can also be applied to various electronic apparatuses (including a cellular phone, a smart phone, a slate device, and a personal computer) incorporating the imaging apparatus or the image processing apparatus.

A function of distance measurement may be incorporated in a computer including the imaging apparatus. The computer may acquire an image photographed by the imaging apparatus and perform calculation of a distance and the blur addition processing on the basis of the image. The function of distance measurement may be incorporated in a computer accessible to a network by wire or radio. The computer may acquire a plurality of images via the network and perform distance measurement on the basis of the images. The obtained distance information can be used for various kinds of image processing such as an area division of an image, generation of a stereoscopic image and a depth image, and emulation of a blur effect.

Note that, as specific implementation on the apparatuses, both of implementation by software (a computer program) and implementation by hardware are possible. For example, various kinds of processing for attaining the object of the present invention may be realized by storing a computer program in a memory of a computer (a microcomputer, an FPGA, etc.) incorporated in the imaging apparatus or the image processing apparatus and causing the computer to execute the computer program. It is also preferable to provide a dedicated processor such as an ASIC that realizes all or a part of the processing of the present invention using a logic circuit. All the functions of the present invention may be realized by one computer or the like. Different functions may be respectively realized by a plurality of computers or the like and the computers may be associated with one another. The functions of the present invention may be realized by a plurality of computers or the like in cooperation rather than being realized by one computer or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-246014, filed on Nov. 28, 2013, which is hereby incorporated by reference herein in its entirety.

What is claimed is:

1. An image processing apparatus comprising:
a system comprising a processor, a memory, or circuitry, the system being configured to function as units comprising:
(1) a distance calculation unit configured to calculate distance information on the basis of a first image based on a light beam from a first pupil region of an imaging optical system and a second image based on a light beam from a second pupil region of the imaging optical system; and
(2) a blur addition unit configured (a) to add a blur to an original image of original images, which are generated based on the first image and the second image, the blur being added by image processing using the distance information calculated by the distance calculation unit and (b) to generate an image in which a focus plane is moved by a predetermined refocus distance from a focus plane of the original image,
wherein the blur addition unit (a) adds the blur to a first original image of the original images when the refocus distance is equal to or less than a threshold and (b) adds the blur to a second original image of the original images, which second original image is an image having an effective F-number greater than an effective F-number of the first original image, when the refocus distance is greater than the threshold.

2. The image processing apparatus according to claim 1, wherein the first image and the second image are images having a same effective F-number,
wherein the first original image is an image obtained by adding up the first image and the second image at a first ratio, and
wherein the second original image is any one of (1) an image obtained by adding up the first image and the second image at a second ratio, an absolute value of a logarithm of which is greater than an absolute value of a logarithm of the first ratio, (2) the first image, and (3) the second image.

3. The image processing apparatus according to claim 2, wherein the first original image is an image obtained by adding up the first image and the second image with a same ratio.

4. The image processing apparatus according to claim 3, wherein the second original image is the first image or the second image.

5. The image processing apparatus according to claim 3, wherein the threshold is a depth of field of the first original image.

6. The image processing apparatus according to claim 3, wherein the threshold is a refocus distance at which resolution of the first original image and resolution of the second original image are equal.

7. The image processing apparatus according to claim 3, wherein the blur addition unit shifts center-of-gravity positions of the first image and the second image according to the distance calculated by the distance calculation unit and generates the second original image on the basis of the first image and the second image after the shift.

8. The image processing apparatus according to claim 3, wherein the blur addition unit (1) implements image correction processing on the first image, using a transmittance distribution of the first pupil region, (2) implements the image correction processing on the second image, using a transmittance distribution of the second pupil region, and (3) generates the second original image on the basis of the first image and the second image after the correction.

9. The image processing apparatus according to claim 1, wherein the first image and the second image are images having different effective F-numbers,
wherein the first original image is an image having a smaller effective F-number of the first image and the second image, and
wherein the second original image is an image having a greater effective F-number of the first image and the second image.

10. The image processing apparatus according to claim 9, wherein the threshold is a refocus distance at which resolution of the first image and resolution of the second image are equal.

11. The image processing apparatus according to claim 9, wherein the units further comprise a control unit configured to control, according to the refocus distance, at least one of the effective F-number of the first image and the effective F-number of the second image.

12. The image processing apparatus according to claim 1, wherein both of the first image and the second image are images having different effective F-numbers according to pixel positions,
wherein the first original image is an image formed of, in each pixel position, a pixel value having a smaller effective F-number of the first image and the second image, and
wherein the second original image is an image formed of, in each pixel position, a pixel value having a greater effective F-number of the first image and the second image.

13. An imaging apparatus including:
an imaging optical system;
an imaging unit configured to acquire a signal based on a light beam transmitted through an exit pupil of the imaging optical system; and
an image processing apparatus comprising:
a system including a processor, a memory, or circuitry, the system being configured to function as units comprising:

(1) a distance calculation unit configured to calculate distance information on the basis of a first image based on a light beam from a first pupil region of an imaging optical system and a second image based on a light beam from a second pupil region of the imaging optical system; and
(2) a blur addition unit configured (a) to add a blur to an original image of original images, which are generated based on the first image and the second image, the blur being added by image processing using the distance information calculated by the distance calculation unit and (b) to generate an image in which a focus plane is moved by a predetermined refocus distance from a focus plane of the original image,
wherein the blur addition unit (a) adds the blur to a first original image of the original images when the refocus distance is equal to or less than a threshold and (b) adds the blur to a second original image of the original images, which second original image is an image having an effective F-number greater than an effective F-number of the first original image, when the refocus distance is greater than the threshold.

14. The imaging apparatus according to claim 13, wherein the imaging unit includes a solid-state imaging sensor including a plurality of ranging pixels, and
wherein the ranging pixel includes (a) a first photoelectric conversion unit configured to receive a light beam from a first pupil region of the imaging optical system and to acquire a first image and a (b) second photoelectric conversion unit configured to receive a light beam from a second pupil region of the imaging optical system and to acquire a second image.

15. The imaging apparatus according to claim 14, wherein the ranging pixel includes a light beam separation unit configured to separate incident light according to an incident direction of light incident on the ranging pixel.

16. The imaging apparatus according to claim 15, wherein the light beam separation unit is a microlens.

17. The imaging apparatus according to claim 15, wherein the light beam separation unit is a waveguide.

18. The imaging apparatus according to claim 14, wherein, in the ranging pixel, an aperture ratio of the first photoelectric conversion unit and an aperture ratio of the second photoelectric conversion unit are different.

19. The imaging apparatus according to claim 18, wherein the ranging pixel further includes an aperture ratio control unit configured to control at least one of the aperture ratio of the first photoelectric conversion unit and the aperture ratio of the second photoelectric conversion unit.

20. An image processing method in an image processing apparatus, the method comprising:
calculating distance information on the basis of a first image based on a light beam from a first pupil region of an imaging optical system and a second image based on a light beam from a second pupil region of the imaging optical system; and
(a) adding a blur to an original image of original images, which are generated based on the first image and the second image, the blur being added by image processing using the calculated distance information and (b) generating an image in which a focus plane is moved by a predetermined refocus distance from a focus plane of the original image,
wherein in adding the blur, (a) the blur is added to a first original image of the original images when the refocus distance is equal to or less than a threshold and (b) the blur is added to a second original image of the original images, which second original image is an image having an effective F-number greater than an effective F-number of the first original image, when the refocus distance is greater than the threshold.

* * * * *